May 22, 1945. E. LATSCHER-LATKA 2,376,788
MOTORCYCLE SPRINGING
Filed April 24, 1941 3 Sheets-Sheet 3

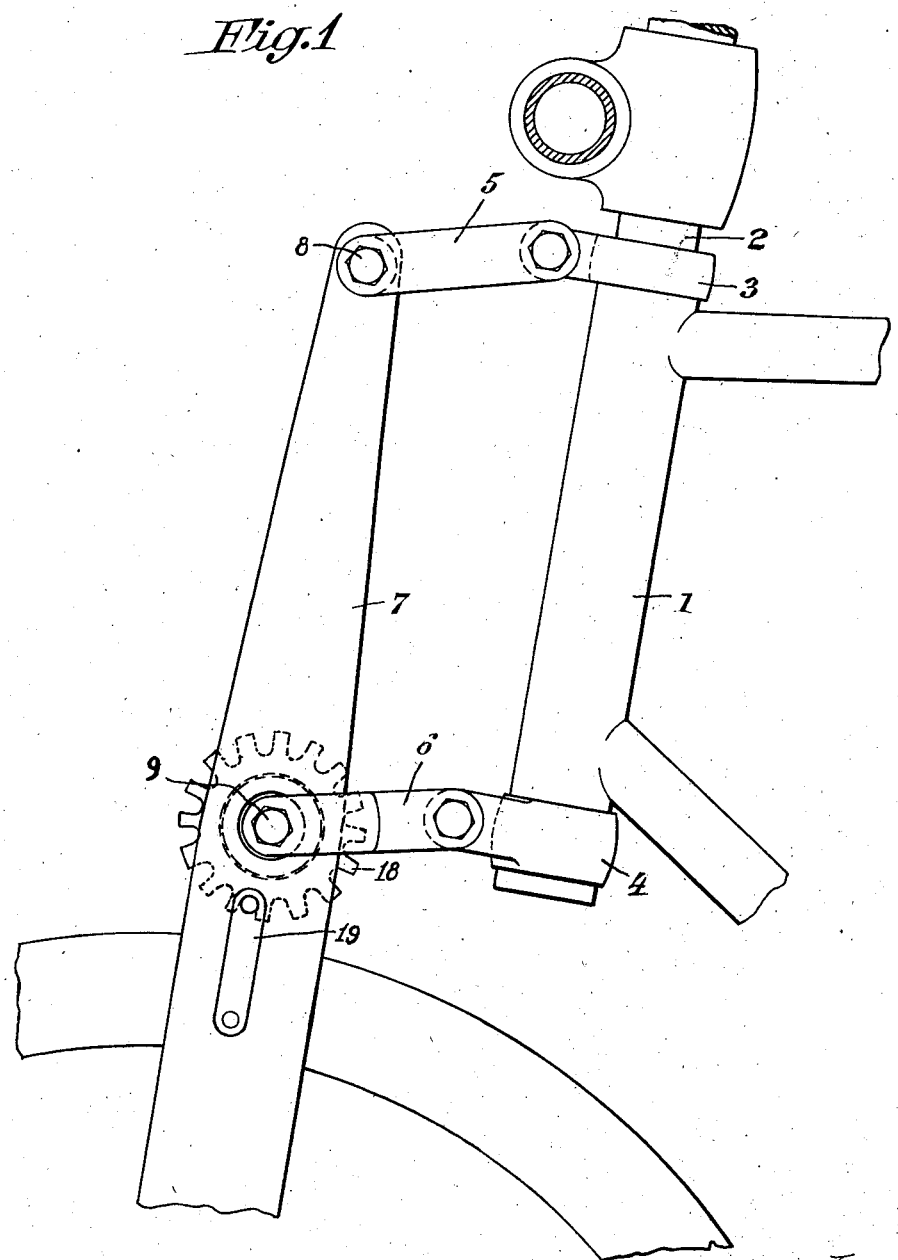

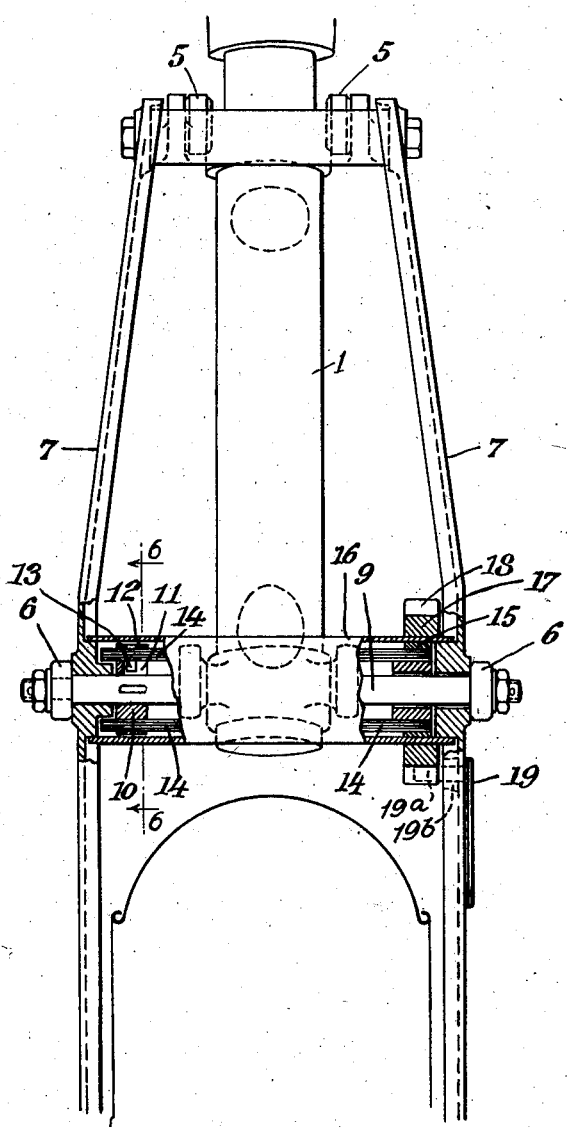

Inventor,
E. Latscher-Latka
by: Glascock Downing Seebold
Attys.

Patented May 22, 1945

2,376,788

UNITED STATES PATENT OFFICE 2,376,788

MOTORCYCLE SPRINGING

Eric Latscher-Latka, Vienna, Germany; vested in the Alien Property Custodian

Application April 24, 1941, Serial No. 390,182
In Germany March 23, 1940

5 Claims. (Cl. 280—277)

This invention relates to cushioning means for vehicles, especially motorcycles, bicycles and the like.

The problem of satisfactorily cushioning such vehicles has long confronted manufacturers and engineers skilled in the art, and many types of springs have been tried, including coil springs, leaf springs, bar type torsion springs and tubular torsion springs. The present invention is related more particularly to the last mentioned type, and comprises a novel arrangement of nested tubular torsion springs, whereby maximum cushioning for the vehicle riders and protection for the vehicle parts are secured in a simple and inexpensive manner.

Preferred embodiments of this invention are illustrated in the accompanying drawings, wherein Fig. 1 is a side elevation and Fig. 2 a front elevation of the front wheel supporting means and associated parts of a bicycle or like vehicle equipped with my improved cushion means, parts being broken away and shown in section, and Fig. 3 is a side elevation of the rear wheel supporting means and associated parts of a bicycle or like vehicle similarly equipped.

Figure 4:
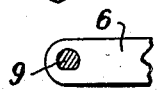
Fig. 4 is a detail view of the forward extremity of one of the links fitted over one extremity of the pivot pin supporting the springs.
Figure 5:
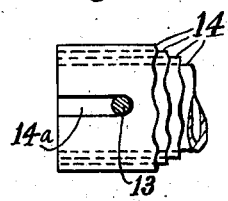
Fig. 5 is a detail view of the nested tubular springs.

Referring now to the drawings, the shaft 2, carrying the handle bar, is journalled in the front hollow frame member 1, and carries suitably spaced collars 3 and 4 formed with eyes for respectively pivoting the rear extremities of parallel links 5 and 6, arranged in pairs, substantially as shown in Fig. 2. The forward extremity of the upper links 5 are pivoted upon a bolt or pin 8, extending through apertures adjacent the upper extremities of the side arms 7 of the front wheel fork, while the forward extremities of the lower links 6 are fixed upon the extremities of a longer bolt or pivot pin 9 so as to hold the pin 9 from rotary movement except with the links 6. The pivot pin 9 is journalled in the fork members 7 at approximately the same distance below pivot pin 8 as separates the collars 3 and 4, whereby a pair of laterally spaced parallelograms are formed with pins 8 and 9 as pivot joints therein.

The spring cushioning means is herein shown as associated with the pivot pin 9, though obviously any of the other pivot pins of the parallelogram could be employed. The cushioning means comprises a series of nested tubular torsion springs 14, shown in Fig. 2 as of four concentric tubes of equal length and slightly varied diameters arranged so that friction between the tubes will come into play shortly after twisting of the tubes takes place to augment the resistance offered by the twisting of the springs. The tubular springs 14 surround the pivot pin 9 and are loosely secured thereto adjacent one end, as by means of radial turnpins 13 carried by the encircling ring 12 (note Fig. 2) passing through radially alined longitudinally extending slots 14a in the tubular springs 14 and into notches 11 in the collar 10, which is swedged or otherwise suitably fixed upon the pivot pin 9. By arranging the notches 11 in the periphery and inner side face of the collar 10, substantially as shown in Fig. 2, the spring 14 can be assembled upon the pivot pin 9 by passing the spring over the opposite end of the pivot pin until the turnpins 13 enter the notches 11 in the collar 10. The other end of each of the tubular springs 14 is secured to the surrounding cylindrical casing 16, as by radial pins carried by the ring 15, swedged or otherwised fixed to the inner periphery of the casing 16, and passed through radially alined apertures in the tubular springs. A suitable washer or the like may be used to space the ends of the tubular springs secured to the casing 16 from the pivot pin. The ends of the casing 16 are journalled upon inwardly extending hub portions formed on the fork members 7 and surrounding the pivot pin 9. Fixed to the outer periphery of the casing 16 is a ratchet wheel 17 having wide spaced teeth 18 to facilitate turning of the casing 16 and tubular springs 14 whenever it is desired to preload such springs or otherwise vary the initial tension of such springs. A pawl 19 carried by one of the fork members 7 extends between adjacent teeth of the ratchet wheel 17, the pawl being herein shown as comprising a resilient body member fixed at one extremity to the fork member 7 and carrying at its free end a plunger 19a adapted to pass through an aperture 19b in the fork member 7 into any of the spaces between adjacent teeth on the ratchet wheel 17.

By springing the pawl 19 to withdraw its plunger from the ratchet wheel 17, the initial tension on the tubular springs 14 can be adjusted at will. Rotation of casing 16 tends to twist the tubular springs 14 as soon as resistance to such rotation is obtained through contact of the turnpins 13 with the side walls of the notches 11 in the collar 10. Continued turning of the casing 16 through manipulation of the ratchet wheel 17, as well as by springing of the vehicle in use, will tend to shorten the length of the twisted tubular springs, and the slots in the ends of the tubular springs fixed to the pivot pin 9 are of sufficient length to permit such reduction in length within the elastic limits of the springs. The pivot pin 9 may be secured against turning relatively to the links 6 in any suitable manner, as for example by flattening a portion of the threaded extremities of the pivot pin and similarly shaping the apertures in the links 6 with a flat wall portion fitting over the flat portion of the pivot pin.

Figure 3:
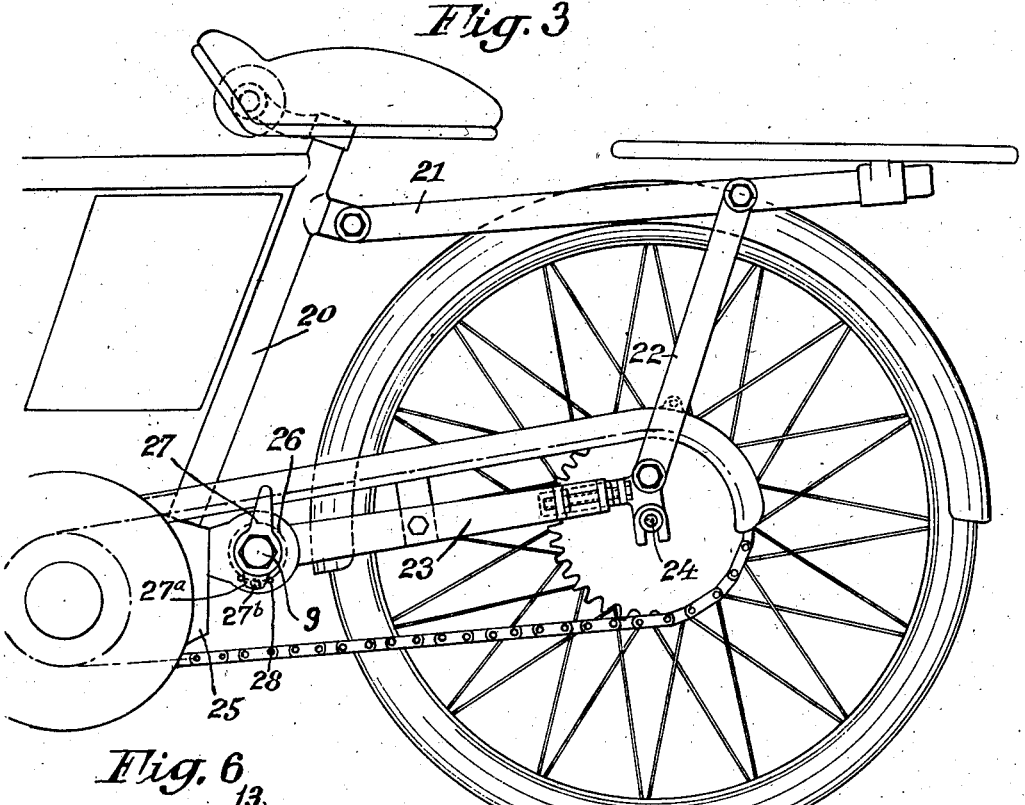
Figure 6:
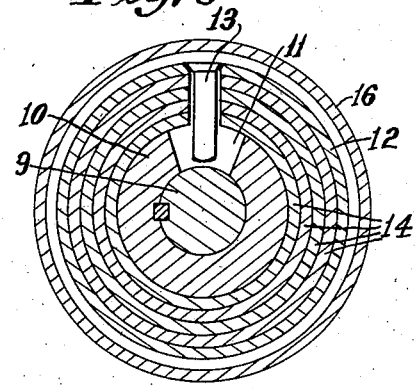
Fig. 6 is a detail vertical section taken substantially on the line 6—6 of Fig. 2.

The rear wheel of a bicycle or like vehicle may be similarly cushioned, substantially as shown in Fig. 3. A parallelogram is formed at each side of the wheel with the rear frame member 20 and rear fork side members 22 forming parallel uprights and links 21 and 23 forming substantially parallel horizontal members. The axle 24 of the rear wheel is mounted in slots at the rear lower corners of such parallelograms and the tubular torsion springs are mounted at the lower front corners of such parallelograms, in the embodiment illustrated in Fig. 3. Means may be provided for adjusting the length of the lower members 23 of the parallelograms.

While substantially the same construction of nested tubular springs 14 may be employed for springing the rear wheel, as herein shown, frame members 23 are fixed upon the outer casing 16 of the spring assembly, and adjustments to secure desired preloading is obtained by initially rotating the pivot pin 9. For this purpose, a lever 27 is fixed upon one extremity of pivot pin 9 and carries a tail-piece 27a in which is mounted a spring-pressed plunger 27b adapted to seat into any of a series of circumferentially spaced apertures 28 in the cheek piece 26 integral with or carried by the wheelblock 25. Lowering of the frame due to the weight of vehicle rider, or upward movements of the wheels, as when striking an obstruction in the road, will serve to twist the tubular torsion springs 14, and such twisting is resisted both by the resiliency of the springs and by friction between adjacent spring members.

It is obvious that this invention is adapted to be used with various types of vehicles, and that changes in structure and arrangement are possible within the spirit and scope of the subjoined claims.

Having thus described the invention, what is claimed as new is:

1. A spring suspension for motorcycles and the like comprising a plurality of links pivotally connected together to form a pair of laterally spaced parallelograms, at least one of the pivotal connections between said links including a pivot pin arranged between two adjacent links and fixed to one of said links, a laminated spring comprising a series of nested tubular members surrounding said pivot pin and secured at one end thereto, and means connecting the opposite end of said spring to the end of an adjacent link, including a cylindrical casing surrounding said spring and secured to the spring and link.

2. A spring suspension as claimed in claim 1 characterized by the provision of means for varying the initial tension of said spring mounted upon said cylindrical casing and said adjacent link.

3. A spring suspension as recited in claim 1 wherein the spring surrounds the pivot pin and is comprised of a plurality of nested tubular members formed with radially-aligned slots adjacent one end, and such end of the spring is secured to the pivot pin by radial pins extending through the slots.

4. A spring suspension for motorcycles and the like comprising a plurality of links pivotally connected together, a pivot pin forming one of such pivotal connections, a spring comprising a plurality of nested tubular members surrounding the pivot pin and formed with radially-aligned slots adjacent one extremity, fastening means extending through said slots for securing such end of the spring to the pivot pin, and means for securing the opposite end of the spring to one of the adjacent links, including a sleeve fastened to the spring and rotatably secured to such link, whereby partial rotation of the sleeve will vary the tension of said spring.

5. A spring suspension for vehicles comprising a plurality of links pivotally connected together to form a pair of laterally spaced parallelograms, a pivot pin forming one of such pivotal connections arranged between two of the laterally adjacent links and fixed against turning movement relatively to one of said adjacent links, a spring comprising a series of nested tubular members surrounding the pivot pin and formed with radially alined slots adjacent one extremity, fastening means extending through said slots for securing such end of the spring to the pivot pin, and means for securing the opposite end of the spring to the other of the adjacent links, including a cylindrical casing fastened to the spring, a ratchet wheel carried by said casing, and a resilient pawl carried by said adjacent link and adapted to coact with said casing in various adjusted positions.

ERIC LATSCHER-LATKA.